No. 661,369.  
F. C. DYCKHOFF.  
VALVE GEAR FOR EXPLOSIVE ENGINES.  
(Application filed Oct. 5, 1899.)  
Patented Nov. 6, 1900.
(No Model.)  
2 Sheets—Sheet 1.
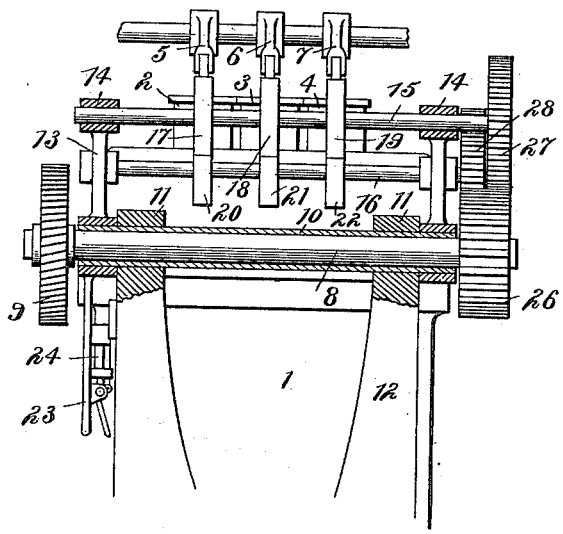
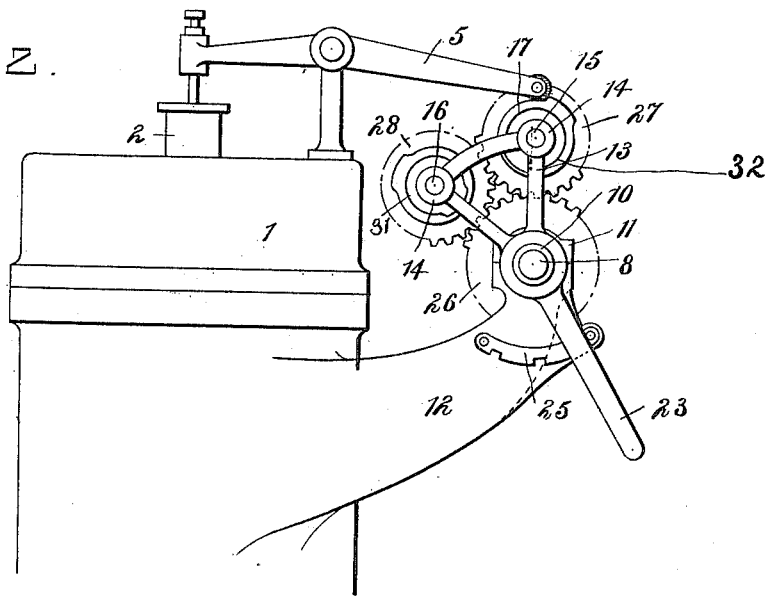
WITNESSES:
Inventor  
Frédéric Charles Dyckhoff No. 661,369. Patented Nov. 6, 1900.
F. C. DYCKHOFF.
VALVE GEAR FOR EXPLOSIVE ENGINES.
(Application filed Oct. 5, 1899.)
(No Model.) 2 Sheets—Sheet 2.
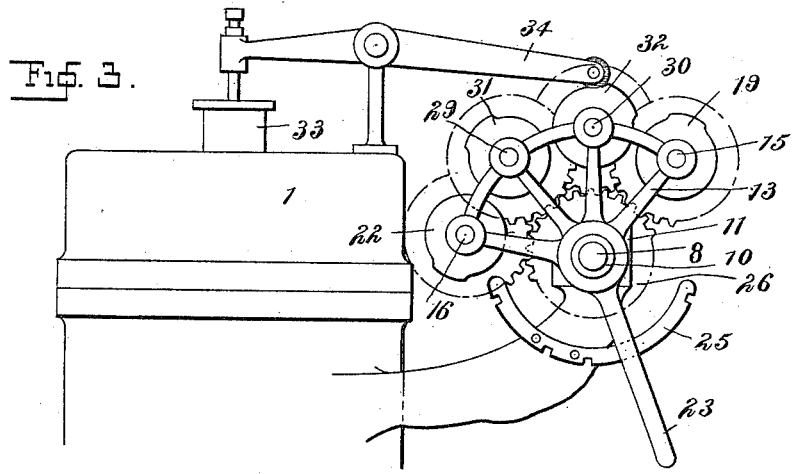
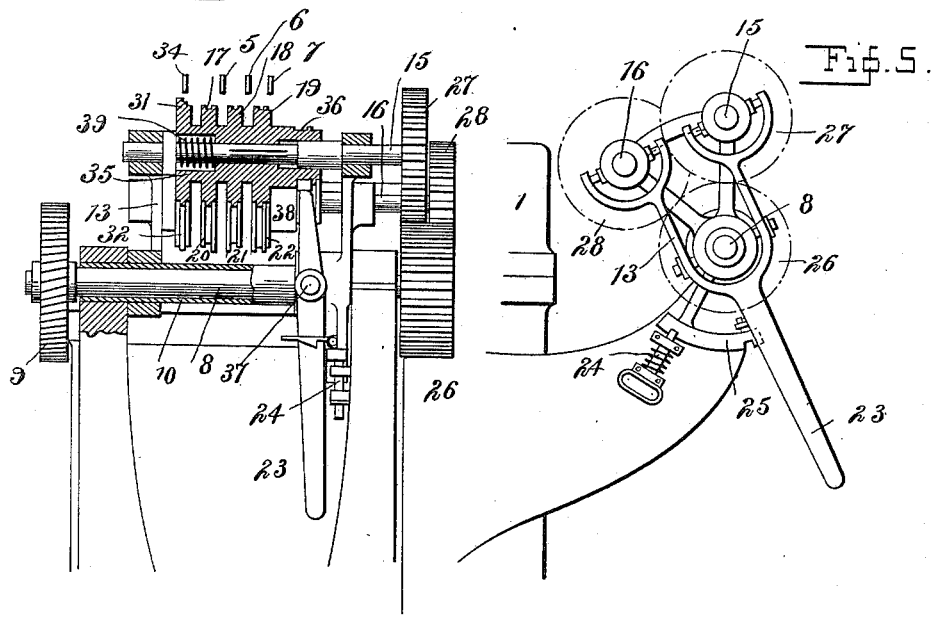
WITNESSES:
Inventor
Frédéric Charles Dyckhoff
THE NORRIS PETERS CO., PHOTO-LITHO., WASHINGTON, D. C.

UNITED STATES PATENT OFFICE.

FRÉDÉRIC CHARLES DYCKHOFF, OF BAR-LE-DUC, FRANCE, ASSIGNOR TO THE DIESEL MOTOR COMPANY OF AMERICA, OF NEW YORK.

VALVE-GEAR FOR EXPLOSIVE-ENGINES.

SPECIFICATION forming part of Letters Patent No. 661,369, dated November 6, 1900.

Application filed October 5, 1899. Serial No. 732,685. (No model.)

*To all whom it may concern:*

Be it known that I, FRÉDÉRIC CHARLES DYCKHOFF, a citizen of Bar-le-Duc, department of Meuse, France, have invented certain new and useful Improvements in Valve-Gears, of which the following is a specification.

This invention relates to improvements in valve-gears, and is particularly intended for application to internal-combustion engines, such as Diesel motors. In such engines or motors the valves are usually operated by cam mechanism, and according to my invention a plurality of cam mechanisms are provided with means for bring one or the other into operation. Thus two cam mechanisms adapted to operate the engine-operating valves to drive the engine in reverse direction may be mounted so as to be interchangeably brought into operative position. In case the engine has special or supplementary valves, such as compressed-air starting-valves to be used in starting the engine, additional cam mechanisms may be provided for the operation of same, with means for bringing same into and out of operation. I prefer to so mount the cam mechanisms that their connection with the driving mechanism is maintained in all positions thereof.

In the accompanying drawings, Figure 1 is a vertical section, and Fig. 2 an end elevation, of a portion of an internal-combustion engine, showing my invention applied to the reversing of the motor. Figs. 3, 4, and 5 show modified forms of the invention adapted to control the starting-valves as well as the regular operating-valves in reversal.

Referring to Figs. 1 and 2, the cylinder of the motor is indicated at 1 and the valves indicated at 2 3, and 4 may represent the fuel, air-admission, and exhaust valves of the motor, controlled by valve-levers 5 6 7.

8 represents a shaft driven from the engine in any suitable manner, as by driving connection to its gear 9, and journaled in a rocking sleeve 10, which is mounted to turn in bearings 11 in a fixed bracket-frame 12. This sleeve carries and forms the center or pivotal support for rocker-frames 13, which carry in bearings 14 the respective shafts 15 16, on which are mounted the respective sets of cams 17 18 19 and 20 21 22, cams 17, 18, and 19 being of conformation and arrangement suitable for coöperating with valve-levers 5 6 7 to operate the valves 2 3 4 to drive the engine in one direction, and cams 20 21 22 being adapted to operate the valves 2 3 4 through valve-levers 5 6 7 to drive the engine in opposite direction. A handle 23 is attached to sleeve 10 to enable same to be rocked around in the bearings 11 to bring one or the other set of cams into operation, and said handle may be locked in one or the other position by means of a spring-catch 24 engaging in notches in a locking-plate 25. A gear 26, fast on shaft 8, engages with gears 27 28 on shafts 15 16, and the motion of the rocking frame constituted by sleeve 10 and arms 13 13 being concentric with the shaft 8 it is apparent that the engagement of the gears 27 28 with the gear 26 is maintained in all positions of the mechanism.

In case the engine is provided with valve mechanism for supplying compressed air in starting I prefer to provide supplementary cam mechanism to operate same, this mechanism being shiftable in and out of operative position. Thus in Fig. 3 I have shown four sets of cam mechanisms arranged concentrically around the shaft 8 on the rock-frame 13, the two outer shafts 15 16 being driven from the middle gear 26 and carrying the regular operating-cams for both directions of movement, as above described, while the intermediate shafts 29 30 carry cams (indicated at 31 32) for operating the starting-valves of the motor, a starting-valve being, for example, indicated at 33 and adapted to be operated through lever 34 by the cam 32. The shafts 29 30 may of course carry the complete cam mechanism for operation of the engine in starting—that is, in addition to the cam for operating the compressed-air valve they may carry cams similar to cams 19 and 22 for operating the exhaust-valves, as shown at 31' and 32'.

In place of mounting four cam mechanisms in concentric arrangement I may, as indicated in Figs. 4 and 5, arrange the cams on two concentrically-arranged shafts 15 16 in such manner that they may be shifted longitudinally on the shaft to bring one or the other of the cams into operative position. Thus I have shown the cams 31 17 18 19 mounted on a sleeve 35, sliding longitudinally on, but splined to, the shaft 15, and operated by the handle 23 engaging in an annular groove 36 in said sleeve, said handle being in this case pivoted at 37 to the rock-frame 13, so as to be capable of turning therein to move the sleeve 35 longitudinally on the shaft 15 or of turning with the sleeve and rock-frame to move the sleeve 35, with its cams, completely away from operative relation with the valve mechanism, at the same time bringing another sleeve 38, with cams 32 20 21 22, similarly mounted on shaft 16, into operative relation. The handle 23 is bifurcated at its inner end, as shown, to engage with both sleeves 35 and 38. A spring 39 tends to hold the sleeve 35 in position for the operation of the working valves. In starting, the handle 23 is temporarily pressed into position shown in Fig. 4, bringing the cams 31 and 19 into operative relation with the compressed-air-valve lever 34 and exhaust-valve lever 7, and then on releasing the handle the sleeve springs over, bringing the cams 17, 18, and 19 into engaging relation with the fuel-valve, air-admission valve, and exhaust-valve devices 5, 6, and 7. A spring-catch 24 engaging with notches in the rock-frame holds it in either set position.

Having thus described my invention, what I claim as new, and desire to secure by Letters Patent, is—

1. The combination with the engine and its controlling-valves, of a valve-actuating mechanism comprising a driving-shaft, driven shafts arranged circumcentrally around said driving-shaft and in constant operative engagement therewith, means for shifting said driven shafts around said driving-shaft and cams arranged on said driven shafts, for the purposes set forth.

2. The combination with an engine and its controlling-valves, of a plurality of cam mechanisms adapted to operate same to cause operation of the engine in the reverse directions, a rocking frame carrying said cam mechanisms and adapted to bring either of same into operative relation with the corresponding valves, and an operating-gear journaled concentrically with the rocking frame, and gearing connected to said cam mechanisms adapted to engage continuously with the said operating-gear.

3. The combination with an engine and its controlling-valves, of an operating-shaft carrying an operating-gear, a rocking frame mounted concentrically with said shaft, a plurality of shafts carried by said frame, each carrying cam mechanisms adapted to coöperate with said valves and a gear for engaging with the operating-gear, and a handle for shifting said rocking frame.

4. The combination with an engine and its controlling-valves, of an operating-shaft carrying an operating-gear, a rocking frame mounted concentrically with said shaft, a plurality of shafts carried by said frame, each carrying cam mechanisms adapted to coöperate with said valves and a gear for engaging with the operating-gear, and a handle for shifting said rocking frame, the said cam mechanisms being longitudinally shiftable on their shafts, and the said handle being movable on the rocking frame and engaging with the cam mechanisms, to shift them on their shafts.

FRÉDÉRIC CHARLES DYCKHOFF.

Witnesses:
AUGUST DOUCE,
P. LEROY.